United States Patent
Iyer et al.

(10) Patent No.: US 12,143,486 B2
(45) Date of Patent: Nov. 12, 2024

(54) MACHINE-TO-MACHINE CRYPTOGRAPHIC MATERIAL ROTATION

(71) Applicant: Corsha Inc., Vienna, VA (US)

(72) Inventors: Anusha R. Iyer, Vienna, VA (US); David Mazary, Sterling, VA (US); Russell Bodine, Arlington, VA (US); Christopher Simkins, Herndon, VA (US)

(73) Assignee: Corsha Inc., Vienna, VA (US)

( * ) Notice: Subject to any disclaimer, the term of this patent is extended or adjusted under 35 U.S.C. 154(b) by 302 days.

(21) Appl. No.: 17/857,656

(22) Filed: Jul. 5, 2022

(65) Prior Publication Data

US 2023/0006841 A1 Jan. 5, 2023

Related U.S. Application Data

(60) Provisional application No. 63/217,812, filed on Jul. 2, 2021.

(51) Int. Cl.
*H04L 9/08* (2006.01)
*H04L 9/32* (2006.01)

(52) U.S. Cl.
CPC .......... *H04L 9/0891* (2013.01); *H04L 9/3268* (2013.01); *H04L 9/3297* (2013.01)

(58) Field of Classification Search
CPC ....................................................... H04L 9/0891
See application file for complete search history.

(56) References Cited

U.S. PATENT DOCUMENTS

| | | | |
|---|---|---|---|
| 2003/0110376 A1* | 6/2003 | Wiener | H04L 9/0891 713/158 |
| 2007/0079119 A1* | 4/2007 | Mattsson | H04L 9/0891 713/193 |
| 2017/0141916 A1* | 5/2017 | Zhang | H04L 9/0894 |
| 2020/0336305 A1* | 10/2020 | Li | H04L 9/0844 |

* cited by examiner

*Primary Examiner* — Bradley W Holder
(74) *Attorney, Agent, or Firm* — Sughrue Mion, PLLC

(57) ABSTRACT

Automatic rotation of materials such as cryptographic materials prevents downtime in computer systems through a method in which the business logic of a DLN, such as a smart contract, receives a request from a given machine to access a resource such as a stream of chained identifiers. The logic checks the stream for a status marker that says the materials need rotation. If so, the business logic replies that rotation is required. When the marker is not there, the logic retrieves the expiry information on the cryptographic material and calculates how long until expiration. If the remaining validity is not enough, the business logic forces a rotation of the cryptographic material by storing the status marker in the stream and notifying the machine. The machine responds by working with the business logic to do the rotation.

20 Claims, 16 Drawing Sheets

|  | active | halted | needs rotation | rotated |
|---|---|---|---|---|
| halt() | to halted | no state change | to halted | error |
| markToRotate() | to needs rotation | error | no state change | error |
| writeToStream() | no state change | error | needs-rotation error | error |
| checkStreamChallenge() | no state change | error | needs-rotation error | error |
| rotateStream() | error | error | to rotated | error |
| resume() | no state change | to active | no state change | error |

FIG. 16

MACHINE-TO-MACHINE CRYPTOGRAPHIC MATERIAL ROTATION

CROSS-REFERENCE TO RELATED APPLICATIONS

This application claims the benefit of U.S. Provisional Patent Application No. 63/217,812 filed on Jul. 2, 2021, the disclosure of which is herein incorporated by reference, in its entirety.

BACKGROUND

Cryptographic materials play a central role in how computer systems establish trust between each other. When cryptographic materials expire, however, they are invalid and other computer systems will not trust them. This leads to downtime. To remedy the situation, the expired cryptographic materials formerly in use must be swapped out for valid cryptographic materials, an action often referred to as "rotating" the cryptographic materials.

The duty to rotate cryptographic materials has traditionally fallen to information technology (IT) support staff as a recurring, manual task. To be successful and avoid downtime, the people who manage cryptographic material rotation must rotate a given computer system's cryptographic materials before they expire. It gets harder to perform this duty successfully because the number of computer systems, and hence the number of computer-to-computer relationships that use cryptographic materials, increases with no end in sight.

As authentication factors, cryptographic materials may be analogized, for the sake of explanation, in the context of how people establish trust with computer systems.

In computer interactions that involve people (user interactions), a user needs to authenticate themself to the computer system. Sometimes users need to supply only one authentication credential or factor, such as a password. Some systems require multiple credentials (multi-factor authentication or "MFA"). One common MFA solution sends an identification number or PIN to a device or to an account known to be associated with the user. The user receives the PIN via an SMS message on the associated device or via an email on the associated account. The user then enters the PIN in response to an authentication challenge from the system. MFA solutions abound: fingerprint readers, facial recognition, secure USB keys, identity cards with smart chips, memorized PINs, and authenticator apps.

Requiring the user to change their credentials from time to time, perhaps by routinely expiring the user's password or the like, helps reduce the risk that a bad actor might somehow get or guess the authorized person's password, and reduce the period of harm if a password is compromised without detection. Tying the password change to another authentication factor, however, further enhances trust by helping ensure that the person changing the password is the original user and not the bad actor. For example, the password change might proceed only after the user receives a PIN via their own smartphone and provides it to the system.

Returning to the context of computer systems that interact with each other in trusted relationships, machines communicate by sending messages to one another. The messages (sometimes referred to as "calls") may follow a predefined format intended to invoke certain predefined actions at endpoints exposed by a relevant applications programming interface ("API"). This kind of communication, where a user is less-directly involved or not involved at all, is what this discussion refers to as machine-to-machine "M2M" communication. Here, "machine" broadly encompasses not just physical computer systems but also virtual machines; it covers not just clients but also servers, pods in orchestration platforms, and application containers; it refers to not just traditional computer devices but also mobile devices, IoT devices, and the applications that run on them.

Cryptographic materials enable a machine to authenticate itself to another computer system and thereby establish trust. One common example of cryptographic materials resides in a public key infrastructure (PKI) system where machines use private keys to encrypt data or to sign things and use public keys to decrypt data and check other machines' signatures on things. Digital certificates, another type of cryptographic material in a PKI, are like public keys but are signed with the private key of a certificate authority (CA) to enhance their trustworthiness.

Public and private keys are usually generated by the machine that is going to use them, and this same machine may typically also be responsible to send a certificate signing request (CSR) to the CA so that it will create a digital certificate from the machine's public key. Here, the CA signs the digital certificate with its own private key. The machine can subsequently present the digital certificate to another machine which, in turn, can cryptographically confirm that the digital certificate has been approved by the CA with resort to the public key of the CA.

SUMMARY

By way of overview, and not limitation, the discussion below explains a way to automatically manage and effect cryptographic material rotation in a M2M environment.

In one embodiment, the M2M environment leverages the way it implements M2M MFA to automatically cause a machine to rotate its cryptographic materials, or any arbitrary materials, prior to when they would have expired.

The discussion below features a method of automatic rotation of materials, intended for use in preventing downtime in computer systems. This method includes a number of steps including, in no particular order, receiving an access request message indicating at least an access operation, a given machine for which the access operation is to be performed, and a first resource to which the access operation pertains; checking for a status indicator, in the first resource, pertaining to a need for rotation of a first expirable item associated with the given machine; when the status indicator indicates the need for the rotation of the first expirable item, outputting a message indicating the given machine and the need for the rotation of the first expirable item.

In this method, when the status indicator is absent from the first resource or does not indicate the need for the rotation of the first expirable item, there are further steps including, in no particular order, retrieving expiry information about the first expirable item; calculating a validity time until an expiration of the first expirable item, based on the expiry information; comparing the validity time with a threshold to make a rotation determination about the first expirable item; and when the rotation determination is to rotate the first expirable item, storing the status indicator in the first resource so that the status indicator indicates the need for the rotation of the first expirable item.

In this method, a further step includes generating a rotation-needed reply to the access request message indicating the given machine and the need for the rotation of the first expirable item.

In this method, more steps may include, in no particular order, receiving a rotate-request message indicating the given machine, the first resource, a second resource, and a second expirable item associated with the given machine; modifying the status indicator, in the first resource, to indicate a completion of the rotation of the first expirable item; and generating a rotation-complete message indicating the given machine, the completion of the rotation of the first expirable item, the second resource, modified to contain a connection to the first resource, and a modified version of the second expirable item.

The discussion also covers an apparatus that performs this method, other related methods and apparatuses, and a system of apparatuses that cooperate to implement this method.

BRIEF DESCRIPTION OF THE DRAWINGS

FIG. 16 provides a table of the different states of the state machine applicable to any given machine stream and lays out how various messages cause changes in state.

DETAILED DESCRIPTION

This disclosure relates to a system and method for automatic cryptographic material rotation in a machine-to-machine (M2M) environment.

Example Environment: Streaming Authentication Model

For the sake of providing a concrete example that teaches the reader how to implement the ideas below, this discussion is set in the context of an example environment. This is just a teaching device. The reader should assume that the benefits of applying the ideas below extend to other environments as well.

The example environment is that already generally described in U.S. Pat. No. 10,992,651 (the '651 patent) issued Apr. 27, 2021 and further in U.S. Pat. No. 11,343,243 (the '243 patent) issued May 24, 2022. As to the '651 patent, the following specific material is incorporated herein by reference for its helpful explanation of a streaming authentication approach: drawing sheet 1 and its accompanying text from column 1, line 63 through column 11, line 60; drawing sheets 3-8 and their accompanying text from column 13, line 7 through column 21, line 48; and the sample API represented in tables 1-9. As to the '243 patent, the following specific material is incorporated herein by reference for its useful description of streaming authentication focusing on M2M communications: drawing sheets 10 through 26 containing FIGS. 10 through 16b and their accompanying text from column 31, line 16 through column 45, line 19.

Architecture of Example Environment

Figure 1:
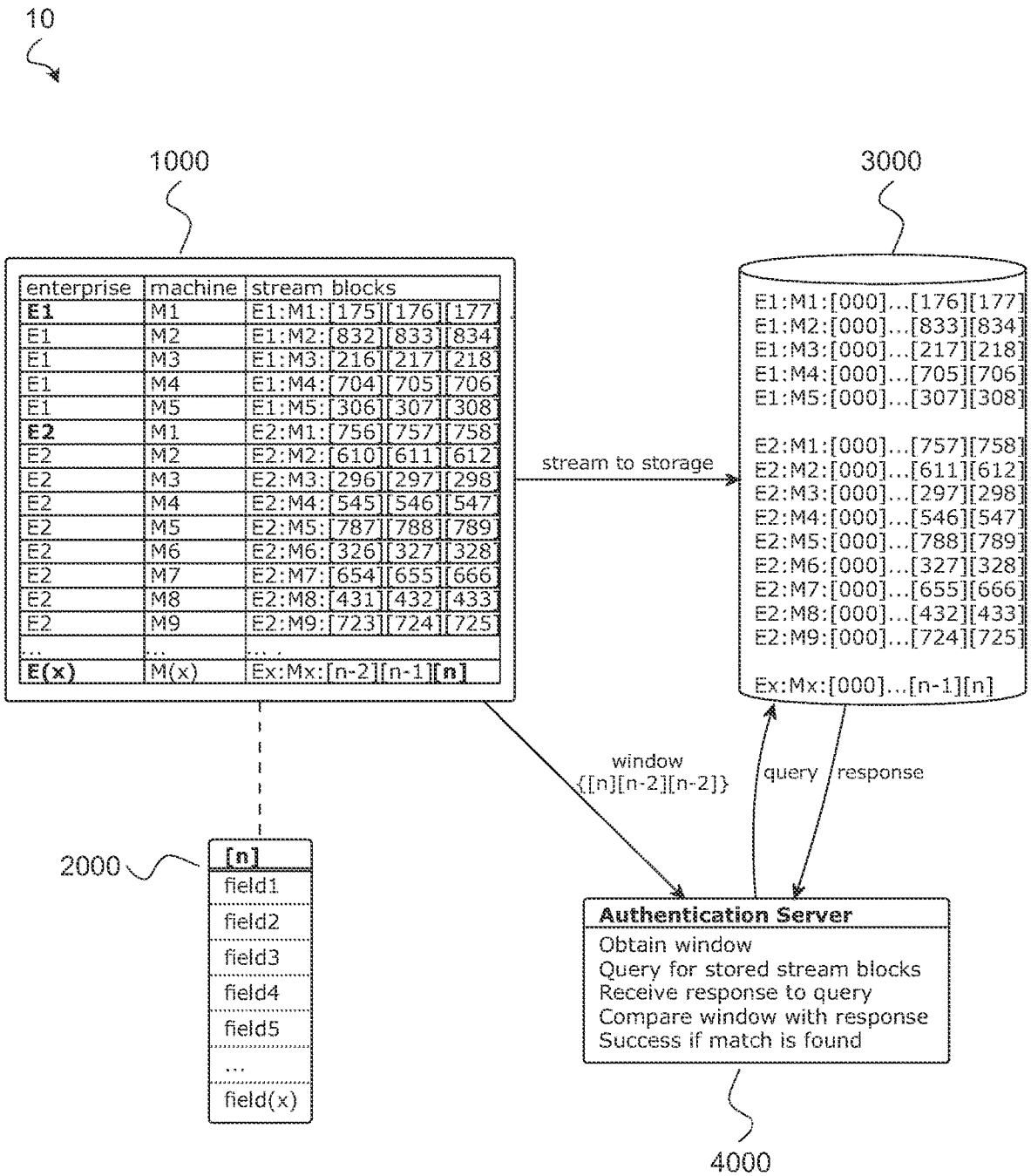
FIG. 1 shows an example environment in which machines send stream blocks to a data store for later use by an authentication server as an authentication factor.

FIG. 1 illustrates, in a high level, simplified, schematic style, a system 10 that performs authentication using stream blocks. FIG. 1 illustrates a machine base 1000, a stream block 2000, a chained identifier store 3000, and an authentication server 4000.

See the column "enterprise" depicted in FIG. 1 and the entries for a given enterprise E1. Machine base 1000 includes enterprises E1 and E2. The machine base optionally includes an arbitrarily large number of enterprises although it may have only one enterprise. One of the enterprises depicted in FIG. 1 is a generically representative enterprise E(x).

The one or more enterprises each have one or more respective machines. See the column "machine" in FIG. 1. For example, enterprise E1 has five respective machines M1 through M5. Enterprise E2 has nine respective machines M1 through M9. Enterprise E(x) has one or more respective machines including a generically representative machine M(x). Machine M(x) of enterprise E(x) represents any given machine of any given enterprise.

Enterprise Streams and Machine Streams

Each enterprise has its own root stream of chained identifiers referred to herein as an enterprise stream. See the illustration in FIG. 4.

Figure 4:
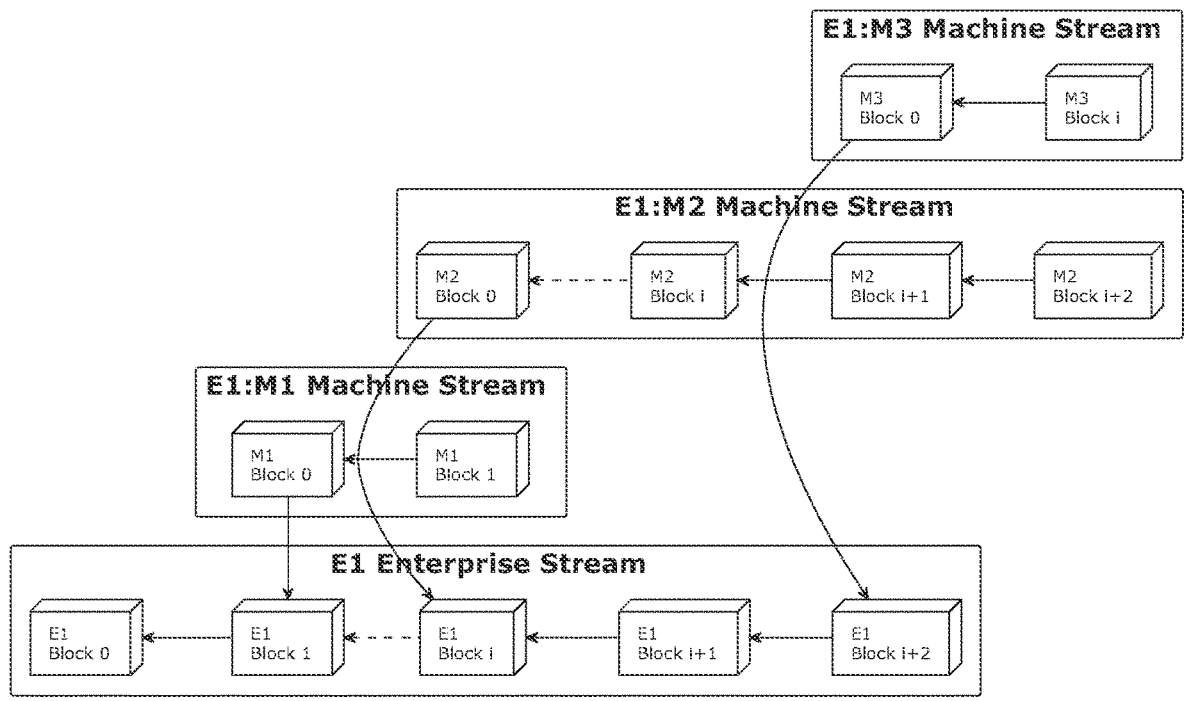
FIG. 4 depicts how machine streams can fork from an enterprise root stream.

In this example environment, each machine establishes an identity by creating its own stream of chained identifiers, referred to herein as a machine stream. The first block of each machine stream, however, is created as a fork from the enterprise stream. This is also illustrated in FIG. 4.

Machines

In FIG. 1, a machine M(x) is a discrete machine. Here, "machine" broadly encompasses not just physical computer systems but also virtual machines, not just clients but also servers, pods in orchestration platforms, and application containers, not just traditional computer devices but also mobile devices, IoT devices, and the applications that run on them.

Stream Blocks and Machine Streams

See the column "stream blocks" in FIG. 1. The first row includes the symbols E1:M1. Here, "E1" refers to enterprise E1 and "M1" refers to machine M1 of enterprise E1. Similarly, the final row in the column "stream blocks" includes the following symbols: "E(x):M(x)". These symbols signify any given machine M(x) of any given enterprise E(x).

These symbols may be thought of or referred to as "stream identifiers". Each machine stream has a stream ID which might equally well be a string or a number assigned around the time the stream is started.

Each of the stream identifiers may be understood to relate, on a one-to-one basis, to a corresponding stream of stream blocks (a machine stream) that begins with an original (or origin) stream block [000] and continues with a first stream block [001], a second stream block [002], and so on, up until a current stream block [n]. Here, the numbers in between square brackets are ordinal numbers that tell the order in which a given stream block was produced within a given stream of stream blocks.

Return to the column "stream blocks" in FIG. 1. The first row pertains to stream identifier E1:M1 (enterprise 1, machine 1). This stream includes the symbols "[175][176][177]" representing three individual stream blocks. The stream block [177] is the one hundred seventy-seventh stream block produced for the given stream after the origin stream block [000]. In FIG. 1, the current stream block in stream identifier E1:M1 is [177]. The first preceding stream block relative to [177] is [176]. The second preceding stream block relative to [177] is [175].

In the example shown in FIG. 1, machine M1 of enterprise E1 locally stores the three most recent stream blocks of machine stream E1:M1. In the state shown in FIG. 1, all of the stream blocks from [000] to [177] have been previously output from machine M1 of enterprise E1 to the chained identifier store 3000 (to be discussed shortly). The stream blocks prior to [175] have also, in one example implementation, previously been discarded by the machine (but not the chained identifier store 3000).

The final row pertains to machine E(x):M(x). This machine locally stores the three most recent stream blocks of its machine stream, namely, the current stream block [n], the first preceding stream block [n−1], and the second preceding stream block [n−2]. The number of stream blocks stored locally is configurable. Other example implementations store a number of stream blocks other than three.

The locally-stored stream blocks may be thought of as a moving window into a given machine stream. For example, in the first row in the column "stream blocks", the locally-stored stream blocks include [175], [176], and [177]. At a future time, stream block [178] will be produced and communicated outside of machine M1 of enterprise E1 and will also be stored as one of the locally-stored stream blocks with the result that stream block [⊆] will no longer be considered part of the window. The window at that future time will include [176], [177], and [178]. Because the content of the three most recent stream blocks changes with each newly-generated stream block, it is fair to refer to the view of the three (or however many) most recent stream blocks as a "moving window" into the stream.

Machine streams may be set up in the system with corresponding cryptographic materials such as a public/private key pair to support secure M2M communications.

Authentication with Stream Blocks

The collection of blocks that each machine streams to the chained identifier store 3000 establish an identity that grows increasingly unique over time. Each machine secured by this streaming authentication has a corresponding stream of stream blocks. Each such stream begins with an origin stream block [000]. Each subsequent stream block that is produced extends the stream. Here, "stream" does not imply the nonstop generation and outputting of stream blocks. Instead, a "stream" is an ordered set of stream blocks for a given machine over time.

The moving window of each stream of stream blocks depicted in FIG. 1 is configured as three, namely, the current stream block, the first preceding stream block, and the second preceding stream block. The number of stream blocks in the moving window may be alternatively expressed as w=3 where w represents the size of the moving window and 3 indicates the number of stream blocks considered to be within the window.

Although this discussion generally explains example implementations where the moving window size is w=3, this value is configurable: in other example implementations, the moving window is a size other than w=3.

A more general expression for the set m of the stream blocks of a given stream within the moving window is given by a concatenation, from i=0 to i=w−1, of [n−i] where [n−i] represents the stream block in the stream having the ordinal position of the current stream block less i. Thus, for a moving window with a window size of w=10, the set m of stream blocks in the moving window includes [n][n−1][n−2] . . . [n−9]. Here, [n] is the current stream block; [n−1] is the immediate precedent of [n]; [n−2] is the immediate precedent of [n−1] and so on. The stream blocks are stored, in one implementation, in a secure local storage. The stream blocks are stored, in various implementations, in a ring data structure, a list data structure, a queue data structure, or the like.

Stream Block Contents

FIG. 1 shows a more detailed view of an example of a given stream block 2000 according to one example. The stream block 2000 includes one or more fields identified as field1, field2, etc., up to the final field field(x). The fields of stream block 2000 are shown stacked one on top of the other for the sake of explanation and understandability. The fields are shown as having an identical length, but this too is only for the sake of explanation and does not imply that the actual fields need to be the same length. The fields are shown in order from 1 to x, but this does not imply any particular importance unless stated otherwise below.

In one example, the stream block 2000 may be thought of as a block of information that has a number of fields. The fields, according to one example implementation, contain (1) a version number that designates the format of the block; (2) a sequence number for the block; (3) a timestamp taken from when the block was created; (4) an identifier for the enterprise; (5) a numerical or textual name for the machine (that is, a stream identifier); (6) a hash of the immediately preceding block from the same stream identifier; and (7) a random number that changes with each block and adds cryptographic entropy to the block. The first through seventh fields are hashed to form another field: (8) a hash of the current block.

In this example implementation, the block is signed with the private key, of the PKI pair set up for this machine stream, before sending. In other implementations, the transport network that carries the block is trusted at a level that obviates the need to sign the block.

The fields, taken together, constitute a "stream block" (here, the term "stream block" is used to distinguish this type of block from other blocks such as the chain block discussed later).

Streams of Chained Identifiers

Because each stream block includes the stream identifier in the appropriate field, each discretely represents an identifier for the given machine. Because each current stream block contains a hash of its first preceding stream block, the stream blocks are chained. Because the origin stream block contains a hash of a block of the enterprise stream, the machine stream is chained back to the enterprise stream. Given all of this connection between preceding and subsequent blocks, and given that each block in the stream contains the stream identifier field, it is appropriate to refer to each machine stream as a stream of chained identifiers.

Each stream block [n] is affected by its first preceding stream block that, in turn, was previously affected by its respective first preceding stream block, and so forth. This is because the stream block [n] contains a hash of the first preceding stream block [n−1]. The stream of chained identifiers evolves with each new stream block, and the unpredictability of each new stream block imbues the stream with a non-deterministic but emergent quality that reflects a totality of previous effects through the entire chain. The uniqueness of each machine stream enables its use in authentication.

The Chained Identifier Store

Chained identifier store 3000 in FIG. 1 stores the chained identifiers (i.e., the stream blocks). As before, the items appearing in the form E1:M1 or the like are explanatory indicia provided so that the reader can more easily track the flow of stream blocks from device to chained identifier store 3000 and are not necessarily part of the actual data stored. In this example, the chained identifier store 3000 stores each stream block from each machine of each enterprise from the origin stream block to the current stream block [n].

Each machine in the machine base 1000 produces stream blocks in a respective machine stream. The stream blocks are communicated to and stored in the chained identifier store 3000, generally as they are produced. In one example implementation, each machine generates one stream block [n] on a periodic basis, such as every few seconds or minutes. The production continues without cease on this periodic basis so long as the machine is running. The machine may try to communicate the stream block [n] for storage in the chained identifier store 3000 as soon as the stream block is produced. When a given machine cannot communicate the current stream block for storage in the chained identifier store 3000, in one implementation the given machine maintains a backlog pool of stream blocks to be transmitted once communication is restored. In another example implementation, when the capacity for storing the backlog pool on the given machine is exhausted, the oldest uncommitted one or more stream blocks are deleted to make room for storing the new current stream block. One concrete implementation uses a ring buffer.

In another example implementation, each machine generates stream blocks on the periodic basis already mentioned, and also in response to a predetermined event such as in response to detecting power-on, initial registration of the device on the network, or in response to an authentication event. For example, when the stream in chained identifier store 3000 is not sufficiently recent (i.e., is "stale"), the device is prompted to freshen the stream by generating and writing new stream blocks to the chained identifier store 3000. Writing new stream blocks is also referred to as a machine extending its respective machine stream.

In the foregoing example implementations, once the machine M(x) has been appropriately deployed, the production and communication of streams of stream blocks occur automatically.

The continuing, periodic or semi-periodic flow of stream blocks from all the devices of the machine base 1000 to the chained identifier store 3000 is depicted in FIG. 1 by the line labeled "stream to storage."

The chained identifier store 3000 is graphically depicted as a database. In one example, the chained identifier store 3000 is a relational database management system. In another example, the chained identifier store 3000 is implemented as a distributed relational database. In yet another example, to be described below in more detail, the chained identifier store 3000 is a distributed ledger network (DLN) or, in a specific implementation, a blockchain (see FIG. 3).

Authentication Server

The authentication server 4000 in FIG. 1 is responsible for handling an authentication event. For example, assume machine M(x) attempts to make an API call to an endpoint that enterprise E(x) exposes. Here, the enterprise wants to ensure that such API calls are answered only for machines that are authenticated.

In one example implementation, authentication is performed using only the chained identifiers without the use of other authentication factors. In another example implementation, the machine must first successfully respond to an initial authentication challenge using a first authentication factor (such as a logonid and password), and subsequently provide one or more of its locally-stored chained identifiers as an additional authentication factor. In other example implementations, the chained identifiers are used in conjunction with any combination of one or more other authentication factors.

Referring back to FIG. 1, with the machine base 1000 and chained identifier store 3000 in the state shown, machine M(x) attempts to interact with enterprise E(x) via some interface such as an API call. The attempt triggers action by the authentication server 4000. Authentication server 4000 responds to the access attempt by issuing a streaming block authentication challenge (not illustrated) that requests the machine M(x) to respond using the stream blocks in its moving window.

Authentication by Stream Proof

As shown in FIG. 1, the machine responds to the streaming block authentication challenge in this implementation by transmitting to the authentication server 4000 all of the contents of its moving window, namely, stream blocks [n], [n−1], and [n−2] (see the arrow labeled "window"). The contents of the moving window are depicted in FIG. 1 between curly braces. Here, the curly braces signify only that the stream blocks are suitably formatted for transmission to the authentication server 4000. For example, the contents of the moving window may be serialized according to a predetermined format acceptable to the authentication server 4000 and then packetized for network communication. Further, in an example, the packets are encrypted using the private key set up for the machine's stream.

Unlike the chained identifier store 3000, the authentication server 4000 does not normally receive copies of all of the stream blocks. Here, it has some blocks from the moving window of the particular machine being authenticated but nothing with which to compare them. The authentication server can therefore issue a query to the chained identifier store 3000 to request a set of the stream blocks, of the given machine stream E(x):M(x).

The chained identifier store 3000 responds to the query by providing the requested set from its store of previously-received stream blocks. The requested set of stream blocks in one example implementation includes just the same number of stream blocks as are in the moving window. In an alternative example, the requested set of stream blocks includes more stream blocks than are in the moving window to account for the possibility of minor communication or processing delays. The query of the authentication server 4000 and the response of the chained identifier store 3000 are depicted in FIG. 1 by arrows respectively labeled "query" and "response."

The authentication server in this example compares each stream block received directly from the machine M(x) with the corresponding stream blocks received from the chained identifier store 3000 in response to its query. This operation is depicted within authentication server 4000 by a process that determines success when the two inputs suitably match. When each stream block of the machine's moving window matches a corresponding one retrieved from the chained identifier store 3000, then the machine is deemed to have successfully met the streaming block authentication challenge. In this situation, the authentication server 4000 outputs an indication of success indicating proper authentication of the machine.

In an alternative implementation, the authentication server 4000 simply sends the received moving window of stream blocks to the chained identifier store 3000 together with a request that the chained identifier store 3000 check those stream blocks against what it already stores. Here, the chained identifier store 3000 makes the determination as to whether there is a suitable match and returns a result to the authentication server 4000.

In yet another alternative implementation, when the machine must respond to an authentication challenge, it computes a hash of each stream block in the moving window and sends just the hashes instead of the entire stream blocks. Here, the authentication server 4000 queries the chained identifier store 3000 but obtains hashes of the stored blocks. The authentication server 4000 determines whether there is a match based on whether the hash values match.

In still another alternative implementation, when the machine must respond to an authentication challenge, it computes a hash of all of the stream blocks in its moving window and sends only one hash value for the whole instead of sending separate hash values for each stream block.

In one further alternative implementation, the machine is adapted so that, whenever the machine is to perform certain operations which will require answering an authentication challenge, the machine proactively sends its request together with the stream blocks, the individual block hashes, or the moving window hash that would answer such an authentication challenge. In other words, in anticipation of the need to answer an authentication challenge, the machine sends the answer without being asked for it.

Regardless of the implementation, the thing that the machine sends to authenticate itself may be referred to herein as the machine sending a "stream proof."

Proof of Possession

Some example implementations thus include a plurality of stream blocks as the stream proof, i.e., full copies of the stream blocks. Other example implementations include as the stream proof information sufficient to show possession of the plurality of stream blocks, i.e., hashes of the stream blocks. In the latter case, the stream proof is, in a more general sense, said to include proof of possession of a plurality of stream blocks since hashes are not the only way to show proof of possession and other proofs are used in various alternative implementations.

Improvements in the Functioning of the Computer Systems

The implementation in which hashes of stream blocks are sent as the stream proof, instead of the stream blocks themselves, improves the internal efficiency of the machine, the authentication server 4000, and the chained identifier store 3000, not to mention the network itself.

The internal efficiency of the machine is improved in that the module that formulates the stream proof needs to send much less data. In the example of stream block 2000, only field8 (the hash of the block) is sent, reducing the amount of data to be sent by at least 75%. The hash for each stream block is computed at the time the stream block is generated, so no additional hash processing is necessary, thereby avoiding the need to expend hardware processor cycles to generate the hash values to be sent. In addition, sending the hash of a stream block is sufficient to demonstrate possession of the stream block since the probability of correctly guessing a given hash value is low. Moreover, where the stream proof includes the respective hash value for more than one block, the odds against correctly guessing all hash values increases exponentially.

The authentication server 4000 also gains efficiency in this implementation of stream proof by sending only hashes. The message containing the stream proof is much shorter, and fewer cycles of the hardware processor are spent in handling the message. Similarly, the authentication server interacts with the chained identifier store 3000 by comparatively succinct communications.

The improvement to efficiency of the chained identifier store 3000 comes from a faster comparison operation. Although in one implementation the chained identifier store 3000 is equipped with machine code that enables its nodes to handle stream proofs in the form of complete stream blocks, in other implementations the nodes are enabled also by other machine code to handle stream proofs in the form of only hashes. Determining an exact match for each hash in a stream proof is less processor-intensive and less memory-intensive than determining an exact match for each stream block. The reduction in processor and memory use can be as much as 75%.

The network itself finds in the stream-proof-by-hash approach a reduced level of traffic when stream proofs are sent compared to the stream-proof-by-block approach. Some of the technical effects of authentication using streaming stream blocks are now discussed.

Example Environment: Underlying Hardware

The structural manner in which a given machine is configured is now discussed.

A machine M(x), when it operates, ultimately runs on a physical device that has a hardware processor or possibly multiple hardware processors. Unless otherwise stated, the discussion below and the appended claims pertain to both the single hardware processor case and the multiple hardware processor case, using the singular "processor" for the sake of convenience. The hardware processor has a small amount of memory including registers, buffers, and cache which are used by the processor to store information for short periods of time. Such information may include instructions or data.

Hardware Processor

A hardware processor is a type of integrated circuit that contains a vast number of transistors and other electrical components interconnected so as to function as an array of logic gates in a pattern that yields predictable outputs in response to a vector of predefined machine code inputs. The hardware processor is adapted to perform a predefined set of basic operations in response to receiving a corresponding basic instruction, the corresponding basic instruction being one of a plurality of machine codes defining a predetermined native instruction set for the hardware processor. The set of predefined machine codes is finite and well-defined for each hardware processor, as are the corresponding basic operations. The set of predefined machine codes that may validly be provided as input to a given hardware processor defines the native instruction set of the hardware processor.

The machine codes of the native instruction set of a hardware processor are input to the hardware processor in binary form. In binary form, the machine codes constitute particular logical inputs that enter the pattern of logic gates that is hard-wired into (i.e., manufactured as) the hardware processor, resulting in a predictable output that depends on the particular machine code used.

Modern software is typically authored in a form other than binary and then converted through various processes such as compilation or interpretation into binary form. The machine codes must be input into a given hardware processor in binary form.

Software is often referred to as being either operating system software or applications software. In general, operating system software bridges between the hardware of a given computer system and the application software. Regardless, at the time software is executed, it is executed in binary form as machine codes selected from the native instruction set of the given hardware processor.

Modern software is complex, performing numerous functions and often amounting to millions of lines of source code. Each line of source code represents one or more (typically many more) individual instructions selected from the native instruction set of a hardware processor. Hardware processors have registers, buffers, cache, and the like which can store binary information. The amount of such storage is much smaller than the set of machine codes that implement a given software "program" or "app."

Memory

The set of machine codes are therefore stored in a memory that the hardware processor can access. In other words, the memory is under control of the hardware processor. The hardware processor, when executing a particular set of machine codes selected from the native instruction set, loads the machine codes from the memory, executes the machine codes, and then loads other machine codes from the memory.

Other Hardware

The machine M(x) in some implementations has a receiver/transmitter unit with which it communicates to the outside world. The receiver/transmitter unit is under control of the hardware processor. In various implementations, the receiver/transmitter unit communicates variously through a mobile telephone network, a satellite network, a wireless local area network, a short-range wireless network such as a personal area network, a citizens' band radio network, or the like. In some implementations, the receiver/transmitter unit has no radio but connects instead through a wired medium such as a cable. In some implementations, the device has more than one receiver/transmitter unit for communication with the outside world. In the implementations discussed below, for the sake of explanation and not limitation, the communication is described as taking place over the Internet, but alternative network implementations are used in alternative implementations.

The machine M(x) in some implementations has an input/output unit with which it may interact with a user. The input/output unit is under control of the hardware processor. In various implementations, the input/output receives inputs from, for example, a keyboard, a touch screen, a stylus, a microphone, a mouse, a motion sensor, a physical button, an embedded camera, a fingerprint sensor, or the like. In various implementations, the input/output provides outputs to, for example, a display, a speaker, an output port, a vibration unit, or the like.

Figure 2:
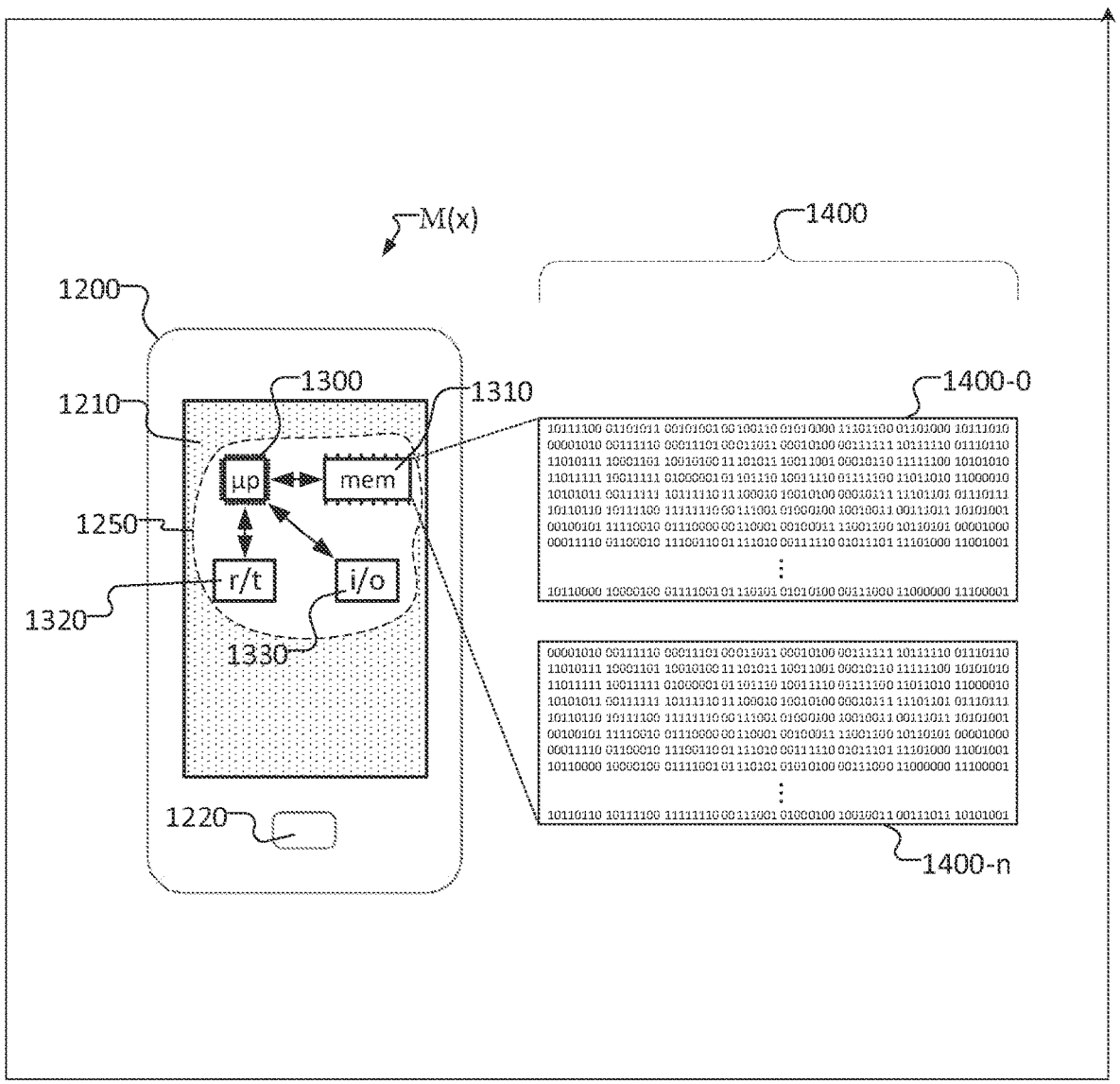
FIG. 2 shows an simplified, highly-schematic depiction of how different sets of machine codes can enable a processor of a computer system to perform various operations.

FIG. 2 shows, in simplified schematic form, an example of any given machine M(x) of any given enterprise E(x). Although the machine illustrated in FIG. 2 is hosted on a mobile phone, other implementations include a tablet, a smart watch, a smart thermostat or other household device, a smart television, a laptop computer, a desktop computer, an e-reader, a drone, an autonomous vehicle, an embedded system, a physical server, a virtual server, a cloud service, or the like.

In FIG. 2, the machine M(x) has an enclosing body or case 1200. Within the device is a display overlaid with a touch-sensitive membrane to form a touch screen 1210. The device possesses one or more physical user interface buttons 1220. In other implementations, the device has no physical user interface buttons. In FIG. 2 a cutaway 1250 reveals a highly simplified schematic of some internal components of the hardware. Hardware processor 1300 communicates with and exercises control over a memory 1310, a receiver/transmitter unit 1320, and an input/output unit 1330.

Relationship Between Machine Codes and Hardware Processor

FIG. 2 also illustrates the storage, in memory 1310, of machine codes 1400. The machine codes 1400 are selected from the native instruction set relevant to the given hardware processor 1300. In more detail, the memory 1310 contains numerous sets of the machine codes 1400 such as a zeroth set 1400-0 selected from the native instruction set, through an n-th set 1400-n selected from the native instruction set. The zeroth set 1400-0 of the machine codes 1400 is illustrated as containing an arbitrary number of machine codes in binary format, suitable for execution on the hardware processor 1300 once loaded from the memory 1310. Likewise, the n-th set 1400-n of machine codes 1400 also contains an arbitrary number of machine codes in binary format. As used here, "arbitrary" does not mean that the codes themselves are unknown or undefined; rather, the count of how many individual machine codes in a given set varies with the functionality that the machine codes are intended to impart, and the particular count of them is not a limitative factor.

The precise implementation of the memory is performed according to the engineering needs of the given device. The memory may be implemented as a hard drive, a solid-state device, a flash memory, an external memory stick, a DRAM, or the like. Furthermore, as used herein, the term "memory" encompasses lower-level implementations where the machine codes pertain to a dedicated security processor such as in a trusted platform environment and/or are stored at a level such as described in the unified extensible firmware interface (UEFI), in a basic input-output system (BIOS), or are reflected in the makeup of a specialized integrated circuit.

Configuration of Machine Authenticator

To configure a machine M(x) to perform authentication using streaming stream blocks, the memory 1310 is modified to include a machine authenticator. The machine authenticator has various modules.

One such module is a stream block generation module comprising a first set of the machine codes (for example, a first set 1400-1 of the machine codes 1400 or the like, not separately illustrated), selected from the native instruction set, adapted to enable the processor to generate a stream block 2000 (such as the example stream block implementations described above).

Configuring the machine M(x) also includes causing the memory 1310 to include a stream block streaming module comprising a second set of the machine codes selected from the native instruction set, adapted to enable the processor to output the stream block 2000 via the receiver/transmitter unit 1320 (for storage in the chained identifier store 3000).

Configuring the machine M(x) also includes modifying the memory 1310 to include a moving window output module comprising a third set of the machine codes selected from the native instruction set, adapted to enable the processor to output the m moving window stream blocks in connection with an authentication event.

With the memory 1310 of the machine thus modified, the machine is adapted to perform streaming authentication using stream blocks according to the implementations mentioned above.

Example Environment: Blockchain Implementation

Figure 3:
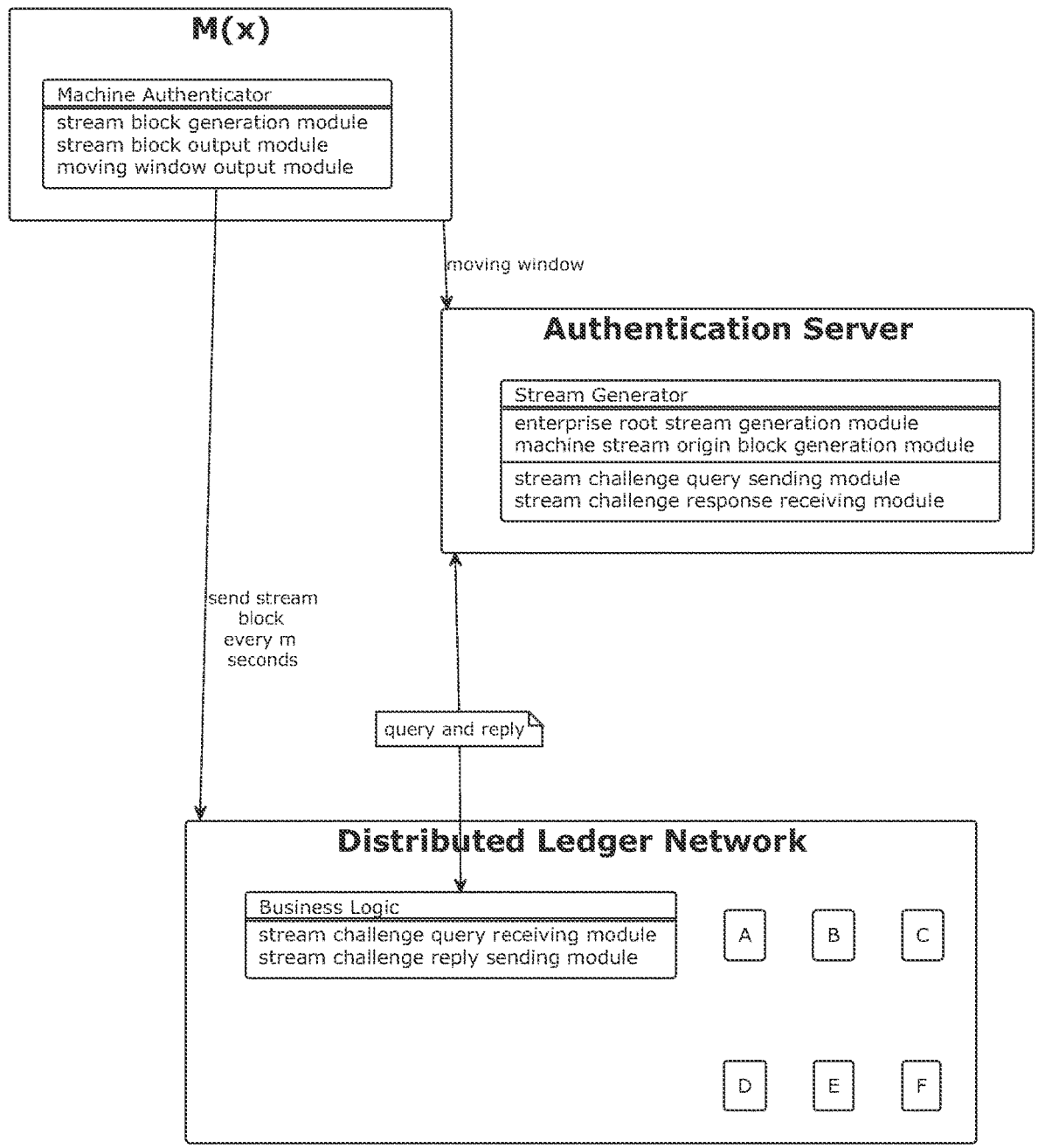
FIG. 3 illustrates a distributed ledger use case in which cryptographic material rotation finds application.

In a specific implementation, shown in FIG. 3, a specific system 11 implements the chained identifier store as a distributed ledger spread across independent nodes A through F of a network. For the sake of this example, chained identifier store 3000 is a DLN and specifically, a blockchain.

The independent nodes A-F cooperate to receive, collect, and store stream blocks such as stream block 2000 from a machine illustrated as M(x) in the drawing. The given machine M(x) is configured with the machine authenticator described above and includes various sets of the machine codes that implement the stream block generation module, the stream block streaming module, and the moving window output module.

Chain Blocks

The stream blocks received from the machines in machine base 1000 are collected as transactions and are stored in the DLN as blocks that are referred to herein as "chain blocks." The chain blocks stored by distributed ledger are larger than stream blocks such as stream block 2000 and contain multiple stream blocks from multiple machines. In other words, the stream blocks are constituent elements of chain blocks. In this implementation, the chain blocks are stored as a blockchain where each chain block contains a hash of its immediate precedent (like the stream blocks where each stream block contains a hash of its immediate precedent too).

The specific system 11 includes an authentication server that has a new stream generator for generating new streams. The stream generator has an enterprise root stream generation module, among others.

Storing Stream Blocks in the Blockchain as Chain Blocks

Prior to an authentication event, machine M(x) repeatedly generates and sends stream blocks such as stream block 2000 to the distributed ledger (see "send stream block every m seconds" in the drawing). In particular, the machine M(x) is pre-configured to transmit its stream blocks to one or more of the nodes A-F. The nodes A-F cooperate to combine the received stream blocks (the stream blocks from the various clients) into a chain block whenever the number of received transactions reaches a threshold value or whenever a pre-defined passage of time has elapsed prior to the number of transactions reaching the threshold value. Each chain block is added to the copy of the blockchain maintained at each of the nodes A-F.

When the machine M(x) makes an API call or the like, machine authenticator previously configured in the machine by machine codes 1400 sends the previously-discussed stream proof. The authentication server validates the stream proof against values previously stored in the distributed ledger. In particular, in the example shown, the authentication server sends a query to the distributed ledger which may be directed to one or more of the nodes A-F. When the reply from the distributed ledger indicates that the stream proof is valid, the authentication server may indicate approval through a message, through an authentication token, or the like.

Additional Technical Effects Due to Using a Blockchain

Some of the additional technical effects of authentication using stream blocks stored in a blockchain-based chained identifier store are worth noting here. These technical effects are in addition to those mentioned with respect to the system 10 previously discussed.

A blockchain-based chained identifier store distributes and stores blocks of cryptographically verifiable data in a way that records are made immutable and decentralized. Therefore, authentication by validating a stream proof is performed with no central storage of security credentials, keys, passwords, or secret material.

Furthermore, the use of a blockchain distributed among some or all of the nodes A-F overcomes risks associated with the compromise of any one of the nodes. For example, if a node such as node C is compromised, any false values that a bad actor may insert into its ledger cannot escape detection by the other nodes.

Moreover, the compromise of a node yields no information useful in predicting or generating the content of future stream blocks. Assuming the compromise of the node is detected (a safe assumption under a blockchain scenario), and it is prevented from receiving further stream blocks and chain blocks, the value of the compromised information will quickly diminish. For example, assume the moving window holds only three stream blocks, and the client sends out a new stream block every minute. The window of opportunity for the bad actor to use the copies of the already-stored stream blocks to attempt to pass an authentication check passes in as quickly as one minute.

Example Environment: Root Streams

A common use case in which M2M communications frequently occur is the authentication of machines or network elements, such as microservices, running in docker containers that are seeking to access a network of an enterprise via an API. In such a use case, the enterprise may be concerned with ensuring that only authorized machines are allowed to access the customer enterprise network through the API.

In one embodiment, the enterprise implements the framework and requires streaming authentication for network access. In another embodiment, the owner of the machine takes responsibility to use a framework for authentication when, for example, the network is a software-as-a-service (SaaS) platform that stores data belonging to the owner of the machine. In this situation, the enterprise may architect the network to allow for implementation of the framework, thereby enabling the owner of the machine to essentially "turn on" or activate the streaming authentication enabled by this framework. This model may be similar to models in which public cloud providers create frameworks for custom implementation of third-party multi-factor authentication solutions for authenticating end users.

Turn now to FIG. 4. This figure depicts a series of blocks (similar to stream block 2000) labeled "E1: Enterprise Stream". This stream of blocks represents the identity of enterprise E1 within the system. An enterprise stream is set up with its origin block (Block 0) by the new stream generator illustrated in FIG. 3. The new stream generator is a process of the authentication server. It includes a set of machine codes that implement an enterprise root stream generation module. Once a new enterprise stream origin block is set up, a different process that is associated with the enterprise can thereafter extend the enterprise stream on some periodic basis with new stream blocks.

FIG. 4 also depicts several machine streams. For example, see the collection of blocks labeled "E1:M1 Machine Stream". Each machine stream, when first set up, has its origin block chained to a block in the relevant enterprise stream. The machine stream origin block generation module in the stream generator of the authentication server (see FIG. 3) generates the origin block for each machine stream such as M1 Block 0 of the E1:M1 machine stream. Each machine stream origin block in the example implementation of FIG. 4 is chained to ("based on") whatever block of the enterprise stream is the current block at that time. In the example, machine E1:M2 was configured at some time later than that of E1:M1. This is why M2 Block 0 is chained to E1 Block i instead of to E1 Block 1.

This type of per-machine seeding process may be said to fork and leverage the trust of the root stream of the enterprise. The machine streams effectively become the identity of the machine as to the given enterprise.

In FIG. 4, each block is shown with arrows connecting back to a block to which it is chained as previously discussed. Arrows with dashed lines indicate a passage of time during which other blocks were generated but are not shown.

Each machine, once provided with its origin block (or, in an alternative implementation, is given enough information to generate its origin block), extends its stream from time to time as discussed previously. Within the blockchain, the streamed blocks form an immutable record of stream blocks that could continue indefinitely.

In use, the machine's machine authenticator (see FIG. 3) may emit a single stream to authenticate a collection of API endpoints for a given machine. For example, a particular machine may be executing a webserver that exposes multiple representational state transfer (REST) API endpoints. A machine may use one stream to authenticate to another machine via the API and then call any of its API endpoints.

A DLN implementation may maintain a ledger of transactions from the machine stream block writing attempts, authentication codes streamed from machine authenticators, transactions using aware machines, deregistration, etc. The DLN may be designed as a private consortium of nodes, each naturally incentivized to verify the identity of not only their own authentication-driven transactions but also those of other responsible parties on the DLN.

The DLN may be private and permissioned using cryptographic materials such as in a PKI system. Nodes may need to establish their identities with a CA and then use private key certificates to establish secure communication channels with their peers on the DLN.

The authentication server can read from the DLN. Additionally, the authentication server may leverage the same CA system/certificates to establish secure communication channels between the DLN and the machine authenticators.

General Architecture to Implement Manual or Time-Based Rotation of Machine Cryptographic Materials Referring to FIG. 3, the DLN includes business logic. Here, where the DLN is a blockchain, the business logic implements a number of the functions described below using software that implements smart contracts. In some blockchain products, this is also referred to as chaincode.

The business logic implements a state machine that supports manual or automatic cryptographic material rotation.

Figure 5:
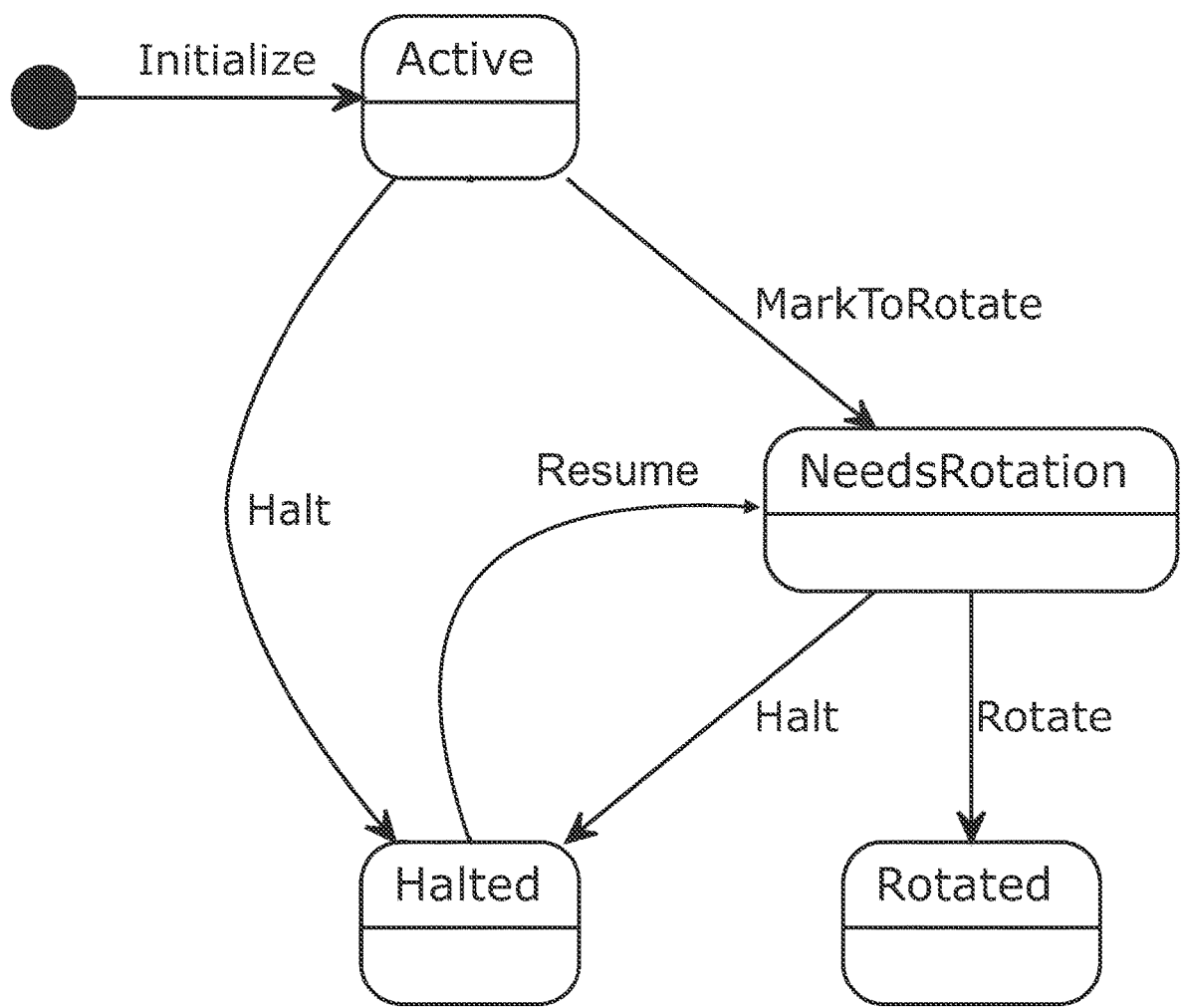
FIG. 5 illustrates a state machine according to an embodiment.

The state machine appears in FIG. 5. Four states are shown. In this example, these states pertain to the cryptographic materials that a given machine uses to communicate with when it sends stream blocks to the DLN to extend its machine stream. This is just an example; the states could pertain to any other cryptographic materials or, more generally, to any materials at all that the system is set up to monitor or track. For this example, however, the discussion focuses on a scenario where the given machine uses a public/private key pair over its connection with the DLN.

In the active state, the business logic allows the machine to write to its machine stream.

In the needs-rotation state the business logic does not allow the machine to write to the machine stream but, instead, returns an error message that the cryptographic material needs rotation.

In the rotated state the business logic considers the machine stream to be permanently capped and permits no further writes to it.

In the halted state, the business logic permits no writes to the machine stream but, unlike the rotated state, a halted state can return to the active state.

The business logic implements the state machine by recording a transaction in the machine stream to reflect its current state. As the state changes, new transactions are recorded by the business logic in the machine stream. The business logic can determine the present state of the state machine for any given machine stream by examining the blockchain for the most recent state machine transaction that was recorded.

Speaking more generally, any given machine stream may be thought of as a resource.

When the business logic examines the blockchain for the most recent state machine transaction, and ascertains the present state, it sees if the PKI pair or digital certificate is marked for rotation; this may be thought of in a general way as checking for a status indicator, in a resource, pertaining to the need for rotation of an expirable item (such as cryptographic materials) associated with the given machine.

Transition from Active to NeedsRotation

The given machine writes to its machine stream via a call that the stream block output module (shown in FIG. 3) makes, namely, WriteToStream( ).

Figure 6:
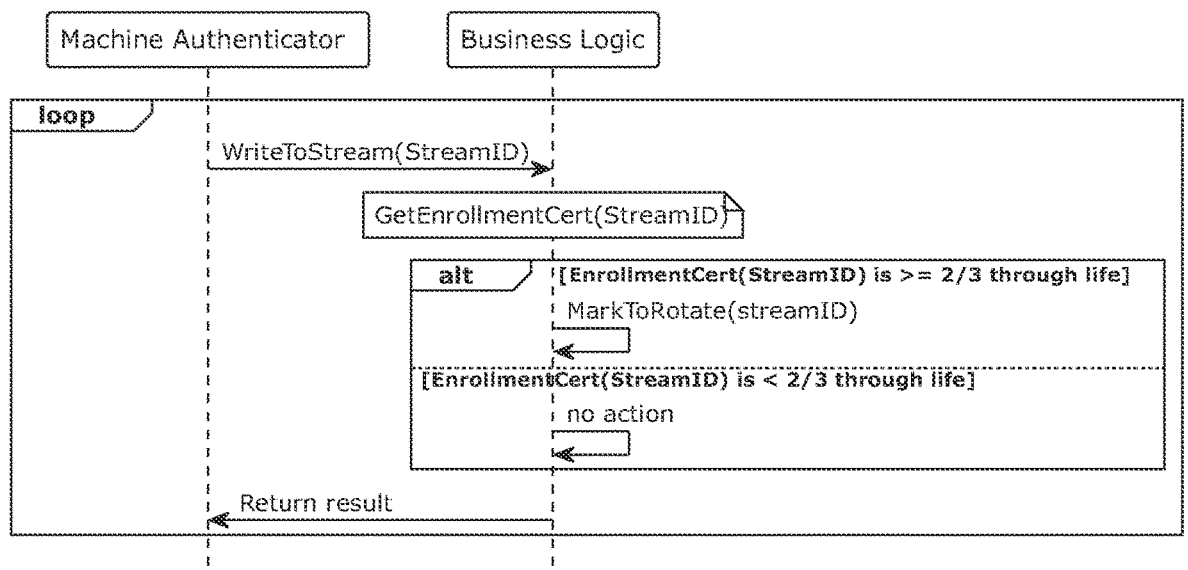
FIG. 6 shows an example algorithm for automatically marking a machine stream for subsequent rotation.

Turn to FIG. 6. This drawing shows the interaction between a given machine's machine authenticator and the business logic when the machine wants to extend its machine stream.

The process begins when the machine sends a message containing a WriteToStream( ) call. The message with the WriteToStream( ) call tells the business logic the identity of the machine, the identity of the machine stream to which the write pertains, and the action that the machine wants to take, namely, to write to the machine stream. In more general terms, such a message can be thought of as an access request message indicating an access operation (a write access in the instance of WriteToStream( ), a given machine for which the access operation is to be performed (that is, the machine that originated the message in the specific example), and a resource to which the access operation pertains (the machine stream pointed to by the WriteToStream( ) call).

In FIG. 6, the business logic executes GetEnrollmentCert( ) This returns enough information to find out when the cryptographic material, namely the digital certificate, expires. In one implementation, the business logic checks to see whether the digital certificate has reached two-thirds of its lifespan. For example, if the digital certificate originally had a thirty-day lifespan, the business logic checks to see if it is twenty or more days from its issue date. If yes, then the business logic executes a MarkToRotate( ) process that records a transaction in the machine stream to say that the needs-rotation state is in effect.

Figure 8:
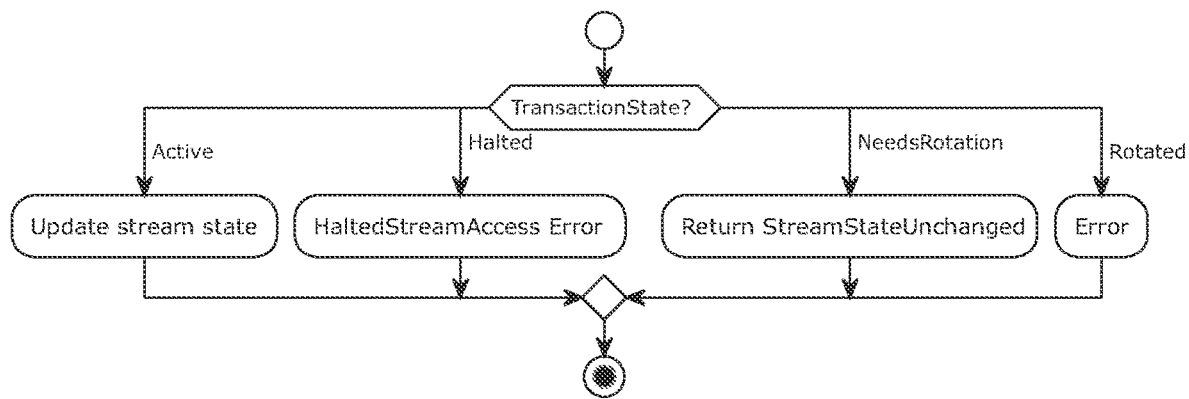
FIG. 8 shows an example algorithm for how the business logic can respond to a message indicating that a given machine stream needs rotation, depending on the state of the stream.

FIG. 8 shows a general algorithm for how the business logic can handle a call to MarkToRotate( ) in the different states of the state machine. Here, where the state was the active state, processing follows the leftmost branch of the diagram to "update stream state" from whence the transaction in the machine stream comes to set up the needs-rotation state.

In more general terms, the actions of the business logic in this regard may be said to include retrieving expiry information about an expirable item associated with the given machine (here, the digital certificate is a specific example of an expirable item associated with the machine), calculating a validity time until an expiration of the expirable item, based on the expiry information. Still speaking generally, the business logic may be said to compare the validity time (such as the time left in the lifespan) with a threshold (such as two-thirds of the lifespan) to make a rotation determination about the expirable item. Further, in general, when the rotation determination is to rotate the expirable item (to rotate the digital certificate in the example above), the business logic goes about storing a status indicator in the resource (recording the transaction in the machine stream in the specific example) so that the status indicator indicates the need for the rotation of the expirable item. In other words, it changes the state of the state machine for the machine stream from the active to the needs-rotation state.

Figure 7:
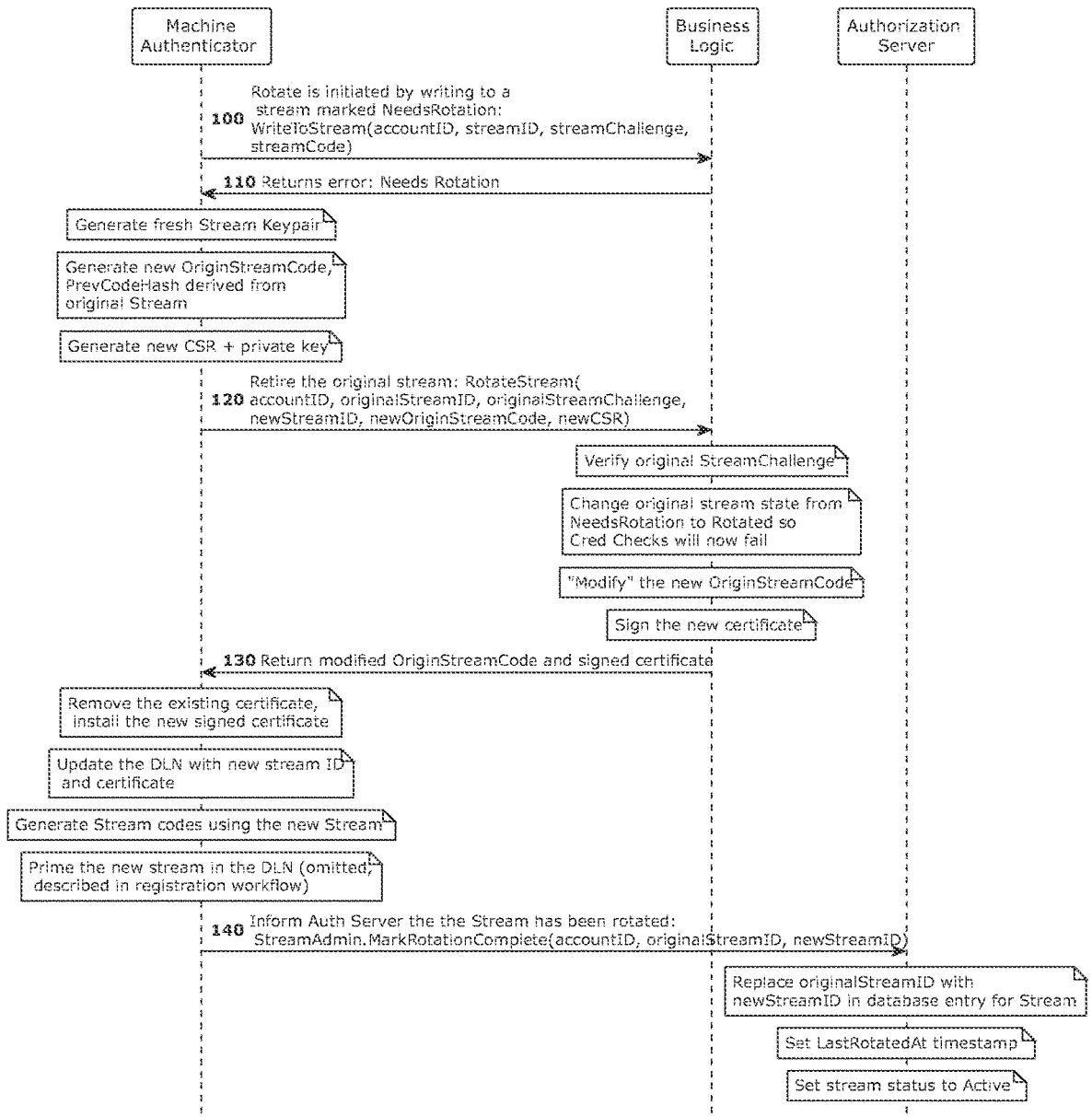
FIG. 7 shows an example algorithm for how a machine can discover its stream needs rotation and what steps can lead to a new machine stream.

The processing that takes place, when a given machine makes a WriteToStream( ) call at a time that the machine stream's state machine is in the needs-rotation state, appears in FIG. 7.

In FIG. 7, via the access request message 100, the machine makes the WriteToStream( ) call to the business logic. The business logic reviews the machine stream to which the machine wants to write and reads the most recent transaction that has a status indicator. In this example, the state is the needs-rotation state. More generally speaking, this operation can be referred to as checking for a status indicator, in a resource (the machine stream in the specific sense), pertaining to a need for rotation of an expirable item (a digital certificate in the example) associated with the given machine.

Figure 9:
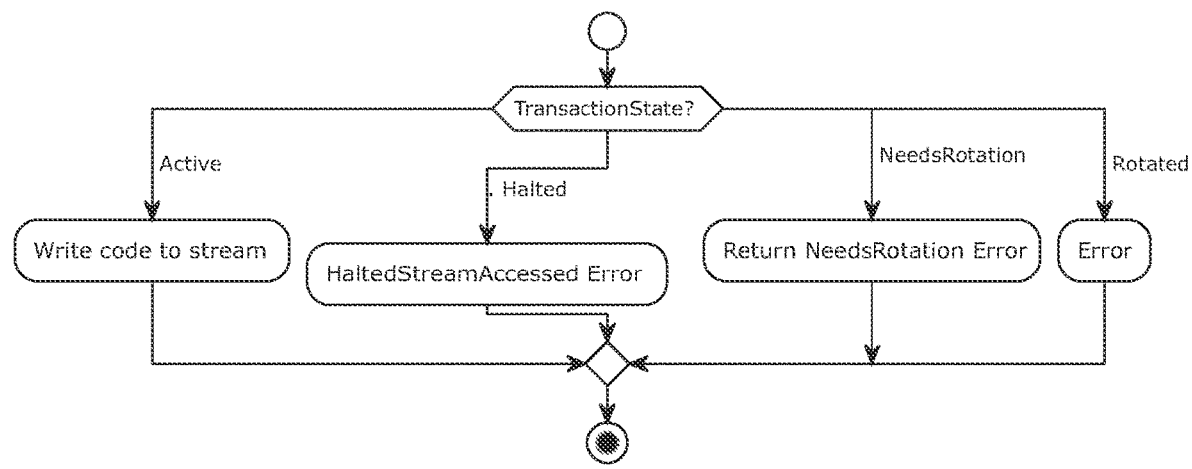
FIG. 9 shows an example algorithm for how the business logic can respond to a message indicating that a given machine requests to extend its machine stream, depending on the state of the stream.

FIG. 9 shows a general algorithm for how the business logic can handle a call to WriteToStream( ) in the different states of the state machine. Here, where the state was the needs-rotation state, processing follows the second branch from the right in the diagram to "return NeedsRotation error".

Figure 10:
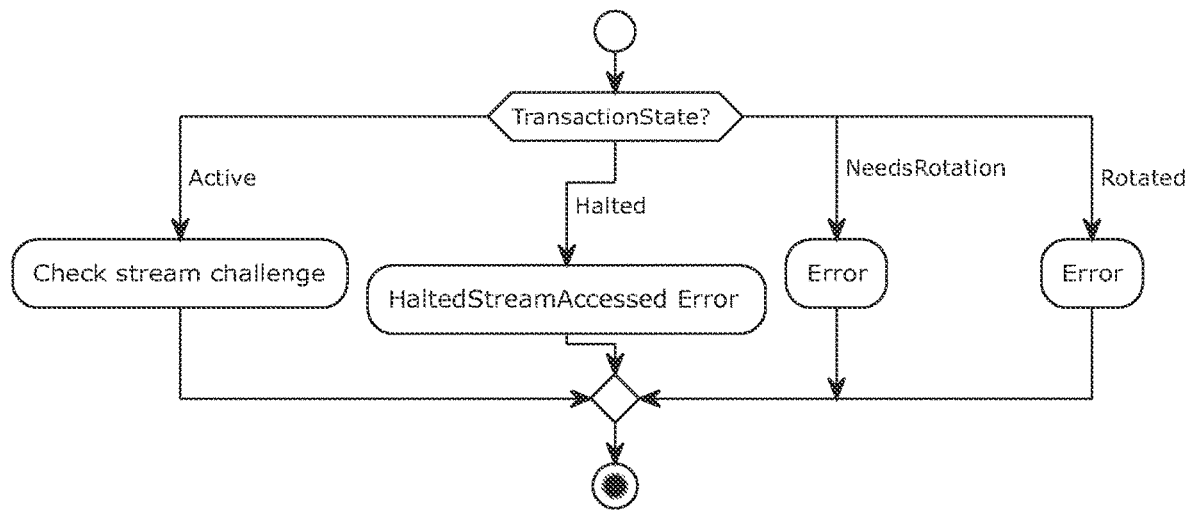
FIG. 10 shows an example algorithm for how the business logic can respond to a message requesting that a stream challenge requires processing, depending on the state of the stream.

FIG. 10 shows a general algorithm for how the business logic can handle a call to CheckStreamChallenge( ) received via the authorization server depending on the different states of the state machine. This call comes to have the business logic check the validity of a stream proof, but is given an error reply unless the machine stream is found to be in the active state.

Returning to FIG. 7, the business logic outputs a rotation needed reply message 110. This message indicates the given machine and the NeedsRotation error indication which may be thought of, in a more general sense, as indicating the need for the rotation of the expirable item.

Rotating Cryptographic Materials and Opening a New Machine Stream

The machine authenticator, now denied the ability to extend its stream, begins the process of certificate rotation. It first generates new cryptographic material such as a new PKI pair.

It also prepares to work with the business logic to establish a new machine stream by generating at least part of a new origin stream block to be used in the new machine stream. The new origin stream block that it forms in part contains at least a hash of the last block it successfully wrote to its old stream. Doing this chains the new machine stream to the prior one, which is ultimately chained back to a block of the enterprise stream. This leaves an unbroken chain of trust back to the enterprise's stream and also further extends the identity that the stream as a whole gives the machine.

The machine authenticator of the given machine also generates a CSR using its new key information.

Next, in FIG. 7, the machine sends the business logic a rotate-request message 120. This message in essence tells the business logic the identity of the given machine, the identity of the stream that is in the needs-rotation state (i.e., the old stream), the identity of the new stream via the partially-complete origin block, and the new cryptographic materials via the CSR. More generally, the rotate-request message indicates the given machine, the first resource (old stream), a second resource (new stream), and another expirable item associated with the given stream (the replacement cryptographic materials).

Figure 11:
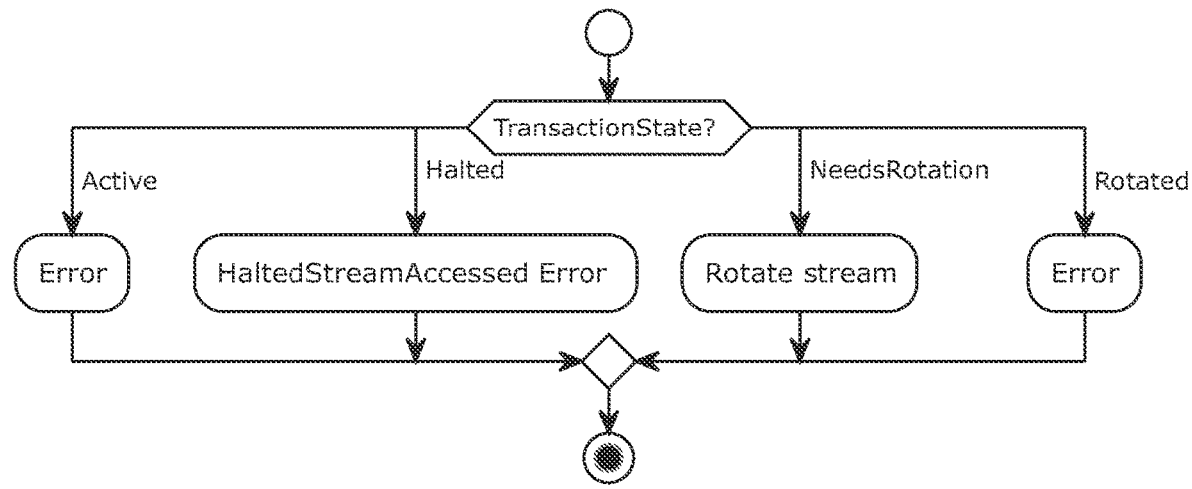
FIG. 11 shows an example algorithm for how the business logic can respond to a message requesting that a stream rotation be effected for a given machine stream, depending on the state of the stream.

Following receipt of the rotate-request message, the business logic changes the old stream's state from the needs-rotation state to the rotated state via a call to Rotate Stream( ) FIG. 11 shows a general algorithm for how the business logic can handle a call to RotateStream( ) in the different states of the state machine. Here, where the state was the needs-rotation state, processing follows the second branch from the right in the diagram to "Rotate Stream". Thereafter the business logic records a final transaction in the old stream indicating the rotated state. This permanently caps the stream and no further blocks may be added to it.

Where the old machine stream and the new machine stream are considered in the more general sense as resources, they may be thought of as a first resource and a second resource.

Where the prior cryptographic materials and the new cryptographic materials are considered more generally as expirable items associated with the given machine, the prior cryptographic materials may be thought of as a first expirable item and the new cryptographic materials may be thought of as a second expirable item.

Where the business logic writes a final transaction to cap the old stream, this may be thought of more generally as modifying the status indicator, in the first resource, to indicate a completion of rotation of the first expirable item.

Returning to specifics, the business logic continues on to seed the partially-formed origin block of the new machine stream with entropy-introducing data, signs the CSR, generates the new digital certificate, and provides the final origin block and signed certificate back to the machine authenticator of the given machine via a new-resource-start message 130.

Figure 12:
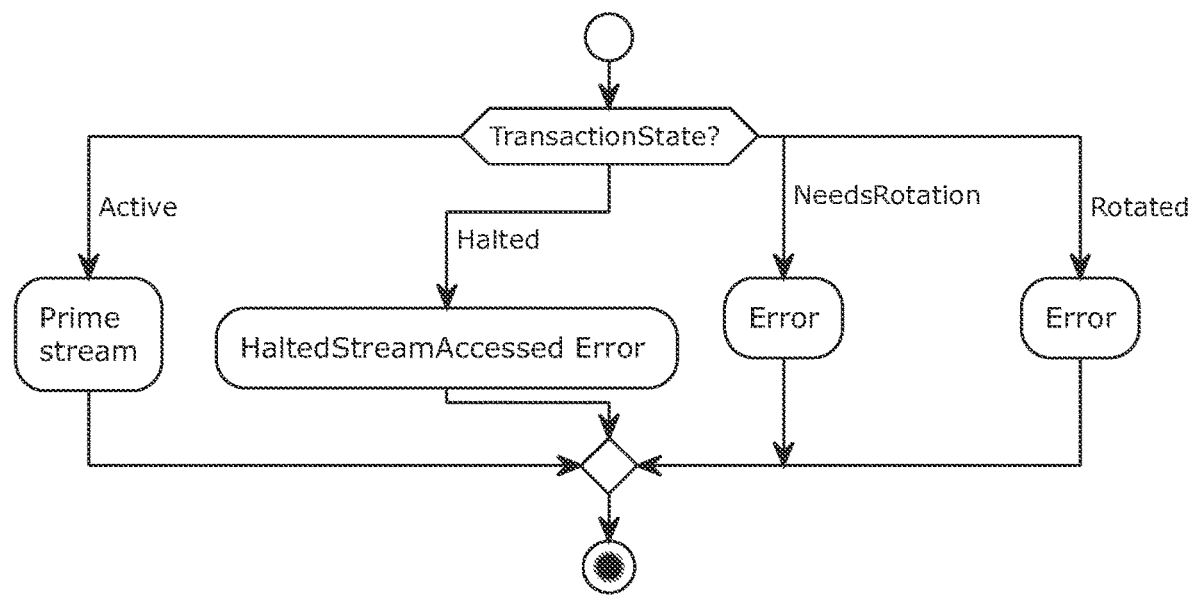
FIG. 12 shows an example algorithm for how the business logic can respond to a message requesting that a new machine stream be primed for a given machine, depending on the state of the stream.

Thereafter, the machine authenticator of the given machine carries out the remaining steps shown, one of which is priming the new stream by generating and sending stream blocks using the new cryptographic materials. As shown in FIG. 12, the priming operation can be effective only when the state machine reflects the active state.

Manual Rotation

Figure 13:
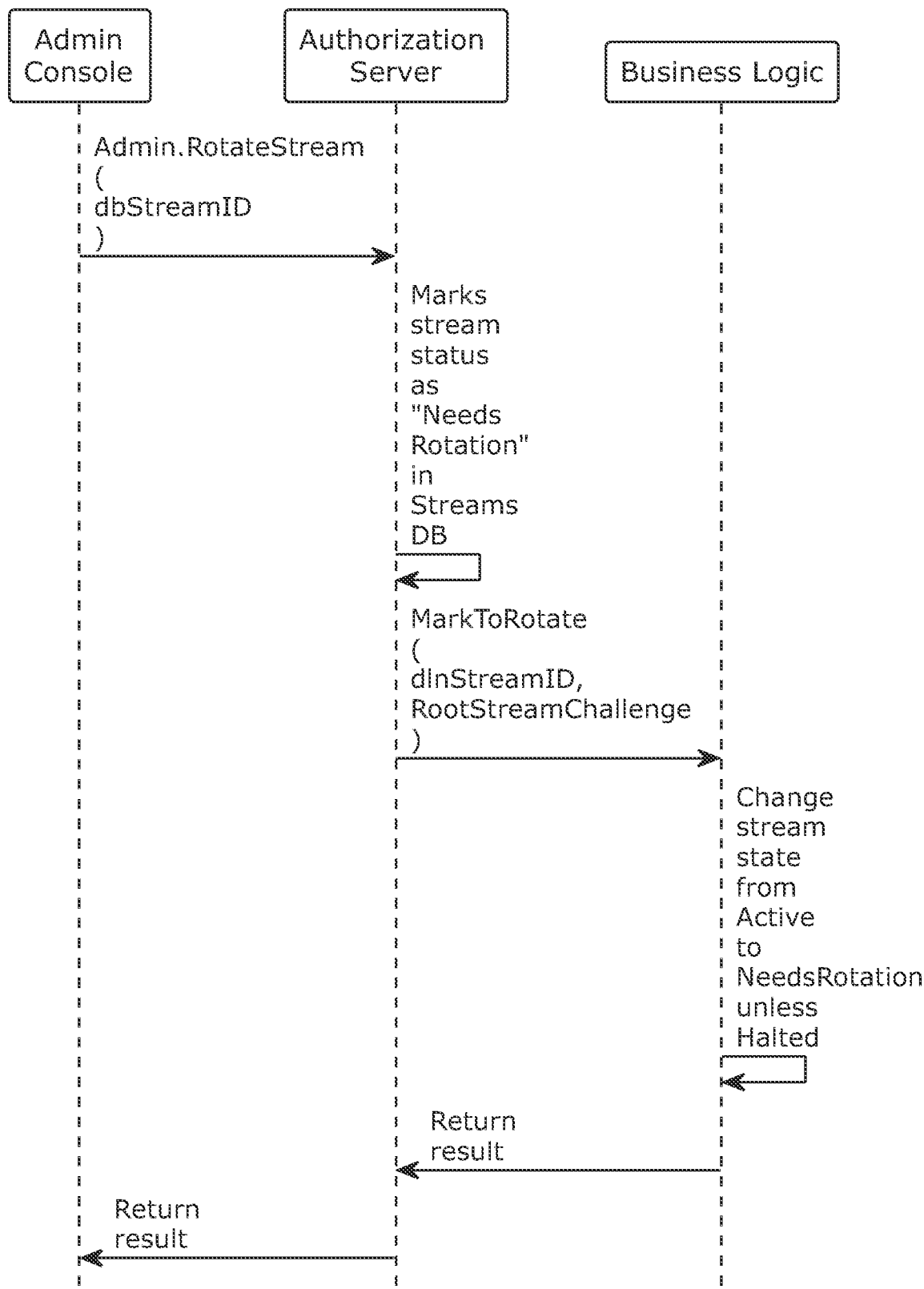
FIG. 13 shows an example algorithm for manually marking a machine stream, of a given machine, for subsequent rotation.

FIG. 13 shows an implementation in which an admin user, via an admin console, can mark a stream for rotation manually. The authorization server, which in an embodiment keeps a local database of status information to reflect the status of each machines as drawn from the DLN, reacts to a manual request by sending a message to the business logic to call MarkToRotate( ) The business logic handles this the same way as has been already described above, the only difference being that the MarkToRotate( ) call has been generated in response to a user input instead of as a result of calculating a validity time until expiration.

Figure 14:
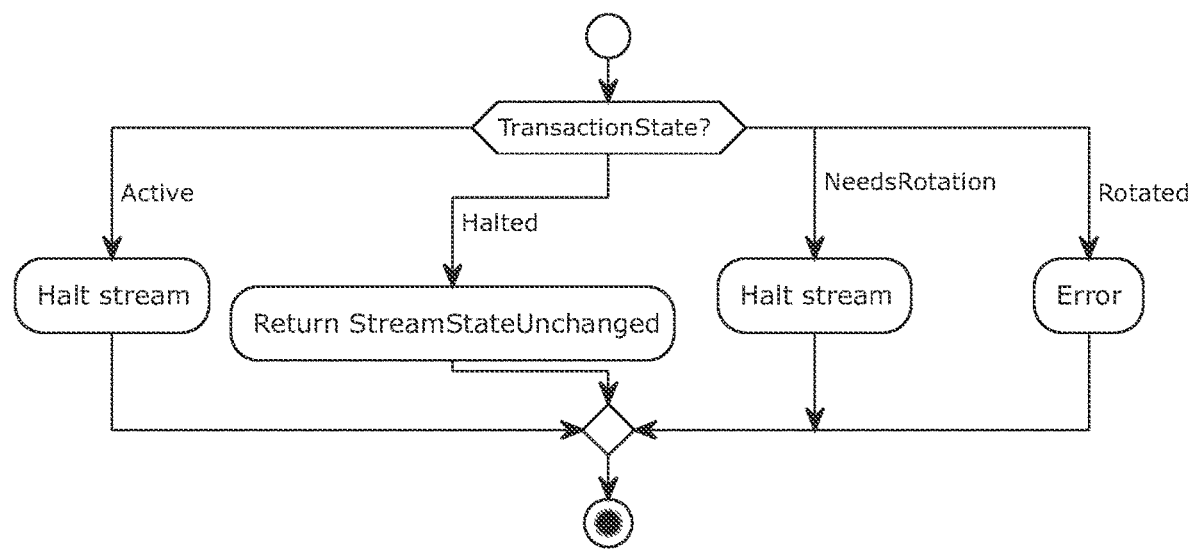
FIG. 14 shows an example algorithm for how the business logic can respond to a message indicating that a given machine stream be halted, depending on the state of the stream.
Figure 15:
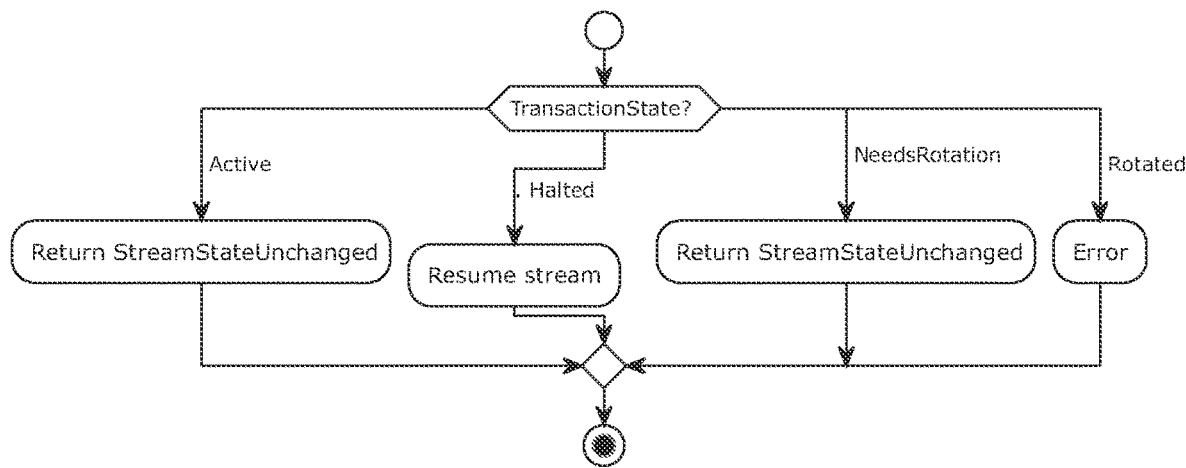
FIG. 15 shows an example algorithm for how the business logic can respond to a message indicating that a given machine stream be resumed, depending on the state of the stream.

For completeness, FIG. 14 and FIG. 15 show how the business logic handles calls to Halt( ) and Resume( ) depending on the present state of the stream being halted or resumed.

FIG. 16 presents, in tabular form, a summary of how the business logic may alter the state of the state machine in response to the calls already discussed above.

CONCLUSION

The systems, architectures, and frameworks of the disclosure may be implemented using any of various servers, computers, virtual machines, and other computing devices. The servers, computers, virtual machines, and other computing devices may include hardware and software for implementing the embodiments of the disclosure. For example, the servers, computers, virtual machines, and other computing devices may include hardware, such as one or more processors, one or more non-transitory memories (e.g., RAM, ROM, disk) storing computer-readable instructions, communication interfaces for communicating with other servers, computers, virtual machines, and other computing devices over computer networks. The processors may access the computer-readable instructions, which may be stored in the form of computer programs, to implement the embodiments of the disclosure. The computer programs may be software that is executed by one or more processors for controlling the servers, computers, virtual machines, and other computing devices to perform functions of the embodiments of the disclosure.

The invention claimed is:

1. A method of automatic rotation of materials, intended for use in preventing downtime in computer systems, the method comprising:
 receiving an access request message indicating:
  an access operation,
  a given machine for which the access operation is to be performed, and
  a first resource to which the access operation pertains;
 checking for a status indicator, in the first resource, pertaining to a need for rotation of a first expirable item associated with the given machine;
 when the status indicator indicates the need for the rotation of the first expirable item, outputting a rotation needed reply message indicating the given machine and the need for the rotation of the first expirable item; and
 when the status indicator is absent from the first resource or does not indicate the need for the rotation of the first expirable item:
  retrieving expiry information about the first expirable item;
  calculating a validity time until an expiration of the first expirable item, based on the expiry information;
  comparing the validity time with a threshold to make a rotation determination about the first expirable item; and
  when the rotation determination is to rotate the first expirable item, storing the status indicator in the first resource so that the status indicator indicates the need for the rotation of the first expirable item.

2. The method of claim 1, further comprising:
 receiving a rotate-request message indicating:
  the given machine,
  the first resource,
  a second resource, and
  a second expirable item associated with the given machine;
 modifying the status indicator, in the first resource, to indicate a completion of the rotation of the first expirable item; and
 outputting a rotation-complete message indicating:
  the given machine
  the completion of the rotation of the first expirable item,
  the second resource, modified to contain a connection to the first resource, and
  a modified version of the second expirable item.

3. The method of claim 1, wherein the first expirable item is cryptographic materials that the given machine uses to access the first resource.

4. The method of claim 1, wherein the access operation is a write operation pertaining to the first resource.

5. The method of claim 1, wherein the first resource is a first stream of chained identifiers pertaining to the given machine.

6. The method of claim 5, further comprising:
 the first stream of the chained identifiers being stored in a distributed ledger network;
 the first stream of the chained identifiers comprises a transaction storing the status indicator, and
 the storing of the status indicator in the first resource includes storing a rotation-needed transaction within the distributed ledger network as part of the first stream of the chained identifiers.

7. The method of claim 6, wherein the checking for the status indicator in the first resource comprises checking the first stream of the chained identifiers for the rotation-needed transaction.

8. The method of claim 7, further comprising:
 the first expirable item being a first digital certificate; and
 the retrieving of the expiry information about the first expirable item including determining an an expiration date for the first digital certificate.

9. The method of claim 8, further comprising making the rotation determination in response to a user input.

10. A distributed ledger network node, intended to help prevent downtime of machines using cryptographic materials, the distributed ledger network node comprising:
 a processing system having a hardware processor operable to perform a predefined set of basic operations in response to receiving a corresponding basic instruction selected from a predefined native instruction set of codes, and with a memory accessible to the processing system;

business logic, comprising machine codes stored in the memory and selected from the predefined native instruction set of codes of the hardware processor, adapted to carry out:
  receiving an access request message indicating:
    an access operation,
    a given machine for which the access operation is to be performed, and
    a first resource to which the access operation pertains;
  checking for a status indicator, in the first resource, pertaining to a need for rotation of a first expirable item associated with the given machine;
  when the status indicator indicates the need for the rotation of the first expirable item, outputting a rotation-needed reply message indicating the given machine and the need for the rotation of the first expirable item; and
  when the status indicator is absent from the first resource or does not indicate the need for the rotation of the first expirable item:
    retrieving expiry information about the first expirable item;
    calculating a validity time until an expiration of the first expirable item, based on the expiry information;
    comparing the validity time with a threshold to make a rotation determination about the first expirable item; and
    when the rotation determination is to rotate the first expirable item, storing the status indicator in the first resource so that the status indicator indicates the need for the rotation of the first expirable item.

11. The distributed ledger network node of claim 10, wherein the first resource is a first stream of chained identifiers pertaining to the given machine.

12. The distributed ledger network node of claim 11, wherein the business logic further comprises machine codes adapted to:
  store the first stream of the chained identifiers as transactions in chain blocks of a blockchain;
  store the status indicator in the first stream of the chained identifiers as one of the transactions; and
  store a rotation-needed transaction as the status indicator.

13. The distributed ledger network node of claim 12, further comprising:
  the first expirable item being a first digital certificate of the given machine; and
  the retrieving of the expiry information about the first expirable item including determining an expiration date for the first digital certificate.

14. The distributed ledger network node of claim 13, wherein the business logic further comprises machine codes adapted to make the rotation determination in response to a user input.

15. A distributed ledger network node, comprising:
  a processing system having a hardware processor operable to perform a predefined set of basic operations in response to receiving a corresponding basic instruction selected from a predefined native instruction set of codes, and with a memory accessible to the processing system;
  a receiver/transmitter unit under control of the hardware processor;
  business logic, comprising machine codes stored in the memory and selected from the predefined native instruction set of codes of the hardware processor, adapted to manage rotation of materials;
  the business logic storing stream-blocks received from a given machine, via the receiver/transmitter unit, as transactions contained in chain blocks of a blockchain, the stream-blocks being constituent elements of a first stream of chained identifiers generated a given machine;
  the receiver/transmitter unit being adapted to receive an access request message with a write request that indicates that the given machine requests to add another one of the stream-blocks to the first stream of chained identifiers;
  after receipt of the write request, the business logic checking an expiry of the materials of the given machine;
  the business logic being adapted to compare the expiry of the materials with a threshold to make a rotation determination; and
  when the rotation determination is to rotate the materials, the business logic entering a rotation-needed transaction into the first stream of chained identifiers and preventing the storing of any more of the stream-blocks into the first stream of chained identifiers.

16. The distributed ledger network node of claim 15, further comprising:
  the receiver/transmitter unit being further adapted to receive a rotate-request message pertaining, for the given machine, to (1) a rotation of the materials and (2) a second stream of chained identifiers; and
  the business logic being adapted to establish the second stream of chained identifiers so as to contain a link to the first stream of chained identifiers, and to enter into the second stream of chained identifiers a status identifier indicating an active status for the second stream of chained identifiers.

17. The distributed ledger network node of claim 16, wherein the materials are cryptographic materials.

18. The distributed ledger network node of claim 17, wherein the cryptographic materials include a digital certificate.

19. The distributed ledger network node of claim 16, wherein the business logic responds to a user input to mark the first stream of chained identifiers as needing rotation by entering the rotation-needed transaction into the first stream of chained identifiers.

20. The distributed ledger network node of claim 15, wherein, when the business logic compares the expiry of the materials with a threshold, the rotation determination is based on whether the expiry of the materials is at a predetermined percentage of a predetermined lifetime of the materials.

* * * * *